US008501338B1

(12) United States Patent
Cardenas-Valencia et al.

(10) Patent No.: US 8,501,338 B1
(45) Date of Patent: *Aug. 6, 2013

(54) METHOD OF CONTROLLED DELIVERY FOR USE IN ELECTROCHEMICAL POWER SOURCES

(75) Inventors: Andres M. Cardenas-Valencia, Tampa, FL (US); Norma A. Alcantar, Tampa, FL (US); Xiaoling Ding, St. Petersburg, FL (US); Ryan G. Toomey, Tampa, FL (US); Lawrence C. Langebrake, Seminole, FL (US)

(73) Assignee: University of South Florida, Tampa, FL (US)

( * ) Notice: Subject to any disclaimer, the term of this patent is extended or adjusted under 35 U.S.C. 154(b) by 324 days.

This patent is subject to a terminal disclaimer.

(21) Appl. No.: 13/090,801

(22) Filed: Apr. 20, 2011

Related U.S. Application Data

(62) Division of application No. 11/958,841, filed on Dec. 18, 2007, now Pat. No. 7,943,259.

(60) Provisional application No. 60/870,514, filed on Dec. 18, 2006.

(51) Int. Cl.
*H01M 6/30* (2006.01)
*H01M 4/36* (2006.01)

(52) U.S. Cl.
USPC ............ 429/118; 429/52; 429/110; 429/219; 429/231.8

(58) Field of Classification Search
USPC ............................................ 429/110, 118, 52
See application file for complete search history.

(56) References Cited

U.S. PATENT DOCUMENTS

| 3,649,363 | A | * | 3/1972 | Mequon et al. | 429/52 |
| 3,884,724 | A | * | 5/1975 | Badger et al. | 429/52 |
| 3,897,267 | A | * | 7/1975 | Tseung et al. | 607/35 |
| 4,189,532 | A | * | 2/1980 | Golz | 429/215 |
| 4,626,482 | A | | 12/1986 | Hamlen et al. | |
| 5,445,905 | A | | 8/1995 | Marsh et al. | |
| 7,195,841 | B1 | * | 3/2007 | Tucker et al. | 429/105 |
| 2006/0105230 | A1 | | 5/2006 | Fitter | |
| 2007/0015048 | A1 | * | 1/2007 | Lee et al. | 429/118 |
| 2007/0054182 | A1 | * | 3/2007 | Kozawa | 429/110 |

FOREIGN PATENT DOCUMENTS

WO 2005064727 A2 7/2005

OTHER PUBLICATIONS

Bessette et al., A Study of Cathode Catalysis for the Aluminum/Hydrogen Peroxide Semi-Fuel Cell, Journal of Power Sources, 1999, vol. 80, pp. 248-253.
Cardenas-Valencia et al., A Micro-Fluidic Galvanic Cell as an On-Chip Power Source, Sensors and Actuators B Chemical, 2003, vol. 95, pp. 406-413.
Cardenas-Valencia et al., Long Shelf-Life, Al-Anode Micro-Fabricated Cells Activated with Alkaline-H2O2 Electrolytes, Journal of Micromechanics and Microengineering, 2006, vol. 16, pp. 1511-1518.

(Continued)

*Primary Examiner* — John S Maples
(74) *Attorney, Agent, or Firm* — Molly L. Sauter; Smith & Hopen, P.A.

(57) ABSTRACT

A system and method for improving electrochemical power sources through the dispensing encapsulation and dispersion into galvanic chambers of an electrochemical cell. Features of the method include the optimization of the concentration levels of chemicals involved in desired energy producing reactions.

17 Claims, 2 Drawing Sheets

OTHER PUBLICATIONS

Cardenas-Valencia et al., Aluminum-Anode, Silicon-Based Micro-Cells for Powering Expendable MEMS and Lab-on-a-Chip Devices, Sensors and Actuators B Chemical, 2007, vol. 122, pp. 328-336.

Li et al., Aluminum as Anode for Energy Storage and Conversion: A Review, Journal of Power Sources, 2002, vol. 110, pp. 1-10.

Licht et al., A High Energy and Power Novel Aluminum/Nickel Battery, J. Electrochem. Soc., 1995, vol. 142, No. 10, pp. L179-L182.

Licht, Novel Aluminum Batteries: A Step Towards Derivation of Superbatteries, Colloids and Surfaces A: Physicochemical and Engineering Aspects, 1998, vol. 134, pp. 241-248.

* cited by examiner

METHOD OF CONTROLLED DELIVERY FOR USE IN ELECTROCHEMICAL POWER SOURCES

CROSS REFERENCE TO RELATED APPLICATIONS

This application is a divisional application claiming the benefit of the filing date of U.S. patent Ser. No. 11/958,841, entitled, "Method of Controlled Delivery for Use in Electrochemical Power Sources", filed on Dec. 18, 2007, now U.S. Pat. No. 7,943,259 which claims priority to U.S. Provisional Patent Application No. 60/870,514, entitled, "Method of Controlled Delivery for Use in Electrochemical Power Sources", filed on Dec. 18, 2006.

STATEMENT OF GOVERNMENT INTEREST

This invention was made with government support under grant number DASG60-00-C-0089 awarded by the U.S. Army Space and Missile Defense Command (SMDC). The government has certain rights in the invention.

BACKGROUND

Electrochemical power sources are the power source of choice for portable devices.

It is known that long-term operation with attractive power/voltage outputs of electrochemical power sources is enhanced via the use of peripherals that provide either continuous, intermittent or even a single addition of chemicals involved in the energy production. The operations that perform these additions normally require additional energy from external sources. Tapping into surrounding power sources can potentially eliminate or reduce the need of power from a peripheral battery. Other choices to address this problem have been the use of dissolution of solid materials, in-situ production of chemical via the addition of common materials, such as water, to control the release of chemicals involved in the energy producing reactions.

However, certain electrochemical power sources use materials that either are not solid or simply do not dissolve in an appropriate manner over time to allow a more precise level of control to improve galvanic reactions.

Accordingly, what is needed in the art is an improved method and system for the controlled release of the chemicals necessary for energy production in an electrochemical cell.

SUMMARY OF INVENTION

The present invention provides a system and method of improving electrochemical power sources through controlled dispensing of materials necessary for energy production in an electrochemical cell.

In a particular embodiment, a method of controlling energy producing chemical reactions in a galvanic electrochemical power sources comprising, positioning a dissolvable capsule encapsulating a solid material into an energy producing reaction chamber of the electrochemical power source and causing the dissolvable capsule to dissolve and initiate a controlled energy producing chemical reaction in the reaction chamber of the electrochemical power source. With this method, dissolving of the capsule results in a controlled release of the encapsulated solid material into the reaction chamber.

In a particular embodiment, the solid material is solid sodium peroxide and the dissolvable capsule is a gelatin capsule. However, other materials and capsule materials are within the scope of the present invention.

In an additional embodiment, a system for controlling energy producing chemical reactions in a galvanic electrochemical power source is provided, including an electrochemical power source having a reaction chamber and a dissolvable capsule encapsulating a solid material positioned within the reaction chamber.

In another embodiment, a system and method of controlling energy producing chemical reactions in a microbial fuel cell is provided comprising positioning a hydrogel incorporated with organic matter within a reaction area of the microbial fuel cell and causing the incorporated organic matter to disperse from the hydrogel and initiate a controlled energy producing chemical reaction in the reaction area of the microbial fuel cell.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention provides several embodiments of the invention in which the use of low cost and environmentally friendly materials are used to enhance the power/energy output of several galvanic cells. A first embodiment includes a controlled delivery of a solid chemical in an electrochemical cell. A second embodiment includes a microbial fuel cell with controlled dispersion and release of organic matter from a hydrogen matrix which enhances the power output of the microbial fuel cell. These embodiments can be combined together, as well as with other encapsulation and dispersing techniques known in the art.

In a particular embodiment, the controlled release of the chemicals involved in the energy production of an electrochemical cell can be performed with the use of materials and matrixes that can either encapsulate and/or disperse the chemicals of interest. The proposed encapsulation schemes and/or chemical dispersion matrices schemes are amiable to large mass production, are cost effective and provide a clear benefit to several types of power sources. Power source manufacturers and users of the cells described here could potentially commercialize this type of enhanced power source technology. Improvements in the art provided by the proposed power sources in accordance with the present invention lie within the power/energy density output as well as in the environmental friendliness of the systems presented.

A specific embodiment of the present invention involves the dissolution of a capsule in which a solid has been trapped. In is known in the art that dissolvable gelatin capsules can control the release of the material within the capsule as the capsule dissolves such that the release can be made at a rate controlled by using such capsules. In a particular embodiment, solid sodium peroxide was encapsulated using commercial capsules for a food supplement, such as a gelatin capsule.

Figure 1:
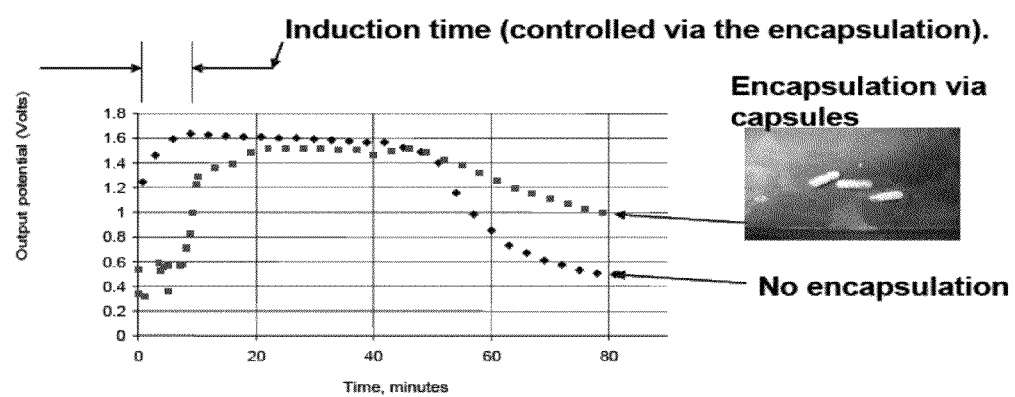
FIG. 1 is a graph showing some of the degree of control in the encapsulation of solid sodium peroxide 2 grams and its direct effect on the potential output of a cell. Experiments at a constant load (10 ohms) Aluminum anode and Composite Silver Carbon cathode collector were utilized. 1 M NaOH solution.

FIG. 1 illustrates the results of an exemplary embodiment of the present invention in which a solid sodium peroxide material is encapsulated and then dissolved using a water solution to control the potential output of the electrochemical cell at a constant load. In this embodiment, the electrochemical includes an aluminum anode and a composite silver carbon cathode.

A microbial fuel cell (MFC) or biological fuel cell is a bio-electrochemical system that drives a current by mimicking bacterial interactions found in nature. In an MFC microorganisms catabolize compounds such as glucose or wastewater. The electrons gained from this oxidation are transferred to an anode, then through an electrical circuit to a cathode. The electrons are then transferred to a high potential electron acceptor such as oxygen. A current flows due to a difference in potential, which results in the generation of power directly from biofuel by the catalytic activity of bacteria.

In an additional embodiment, a hydrogel matrix is used to host powdered matter to enhance the performance of a microbial fuel cell (MFC). A hydrogel is a network of polymer chains that are water-insoluble, sometimes found as a colloidal gel in which water is the dispersion medium.

In an exemplary embodiment, two carbon cloths were used as the electrodes of the MFC. The anode was buried in the sediments and a planar hydrogel matrix was placed on top of the anode. The cathode was held on top of the anode and positioned about 10 centimeters away from the sediment layer.

To provide the organic matter, Blue Runners caught from Tampa Bay were boiled and the meat was separated and then dried in an oven. After completely dried, the meat was ground and passed through a 250 nm sieve and then stored in a refrigerator before use. To provide the hydrogel, 80 mL of water was added into a mixture of 4 g of monomer N-isopropylacrylamide, 160 mg of N,N-methylenebisacrylamide as a crosslinking agent, 10 mg of ammonium persulphate as an initiator and 0.2 g of dried fish powder as the organic matter. The solution was flushed with $N_2$ for 5 min or until the monomer dissolved. The mixture was under ultrasonication for 5 min for the purpose of mixing. Then, 50 μL of TEMED was added as an accelerator. The solution was flushed with $N_2$ for 1 min. The solution was sealed for 1 hour at room temperature for polymerization.

Figure 2:
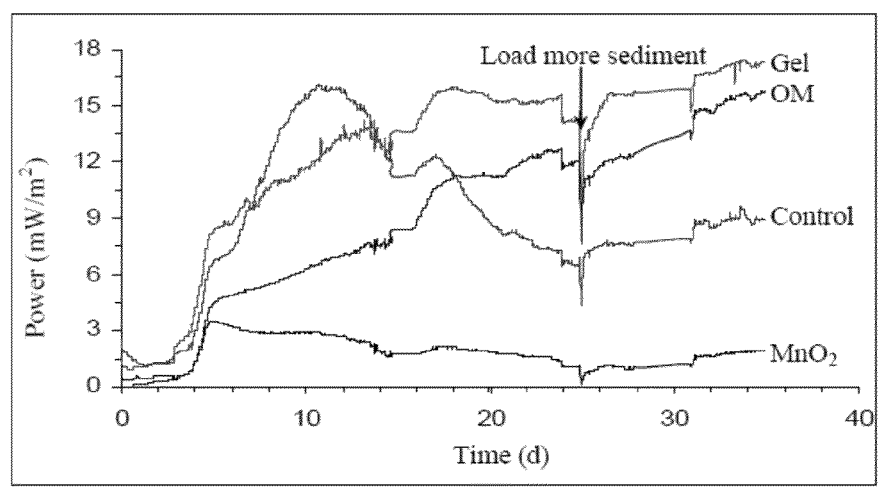
FIG. 2 is a graph showing hydrogels incorporated with dried fish powder and $MnO_2$ inside and nothing are labeled as: OM, $MnO_2$ and Gel, correspondingly.

The results of the hydrogel matrix incorporating organic matter are shown in FIG. 2. The hydrogels incorporated with dried fish powder and $MnO_2$ inside and nothing are labeled as: OM, $MnO_2$ and Gel, correspondingly. The systems with hydrogels were compared with a control one that did not use hydrogel. The results are the average between duplicated samples. It can be seen that the hydrogen matrix incorporating organic matter is accordance with the present invention improves the output of the microbial fuel cell.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described.

What is claimed is:

1. A method of controlling energy producing chemical reactions in a galvanic electrochemical power sources, the method comprising:
    positioning a hydrogel matrix incorporated with a solid material or a dissolvable capsule encapsulating a solid material into an energy producing reaction chamber of the electrochemical power source; and
    adding a water solution comprising NaOH to the reaction chamber, the addition of the water solution causing the solid material to disperse from the hydrogel matrix or the dissolvable capsule to initiate a controlled energy producing chemical reaction in the reaction chamber of the electrochemical power source.

2. The method of claim 1, wherein the dispersion of the solid material from the dissolvable capsule further comprise dissolving of the capsule, and the dissolving of the capsule results in a controlled release of the encapsulated solid material into the reaction chamber.

3. The method of claim 1, wherein the solid material is solid sodium peroxide.

4. The method of claim 1, wherein the dissolvable capsule is a gelatin capsule.

5. The method of claim 1, wherein the galvanic electrochemical power source further comprises an aluminum anode and a composite silver carbon cathode.

6. A method of controlling energy producing chemical reactions in a galvanic electrochemical power sources, the method comprising:
    positioning a hydrogel matrix incorporated with a solid material or a dissolvable capsule encapsulating a solid material into an energy producing reaction chamber of the electrochemical power source; and
    adding a water solution comprising muriatic acid to the reaction chamber, the addition of the water solution causing the solid material to disperse from the hydrogel matrix or the dissolvable capsule to initiate a controlled energy producing chemical reaction in the reaction chamber of the electrochemical power source.

7. The method of claim 6, wherein the solid material is solid sodium peroxide.

8. The method of claim 6, wherein the dissolvable capsule is a gelatin capsule.

9. The method of claim 6, wherein the galvanic electrochemical power source further comprises an aluminum anode and a composite silver carbon cathode.

10. A system for controlling energy producing chemical reactions in a galvanic electrochemical power source, the system comprising:
    an electrochemical power source having a reaction chamber; and
    a hydrogel matrix incorporated with a solid material or a dissolvable capsule encapsulating a solid material positioned within the reaction chamber, wherein the solid material is dispersible from the hydrogel matrix or the dissolvable capsule when a water solution comprising NaOH is added to the reaction chamber.

11. The system of claim 10, wherein the solid material is solid sodium peroxide.

12. The system of claim 10, wherein the dissolvable capsule is a gelatin capsule.

13. The system of claim 10, wherein the galvanic electrochemical power source further comprises an aluminum anode and a composite silver carbon cathode.

14. A system for controlling energy producing chemical reactions in a galvanic electrochemical power source, the system comprising:
   an electrochemical power source having a reaction chamber; and
   a hydrogel matrix incorporated with a solid material or a dissolvable capsule encapsulating a solid material positioned within the reaction chamber, wherein the solid material is dispersible from the hydrogel matrix or the dissolvable capsule when a water solution comprising muriatic acid is added to the reaction chamber.

15. The system of claim 14, wherein the solid material is solid sodium peroxide.

16. The system of claim 14, wherein the dissolvable capsule is a gelatin capsule.

17. The system of claim 14, wherein the galvanic electrochemical power source further comprises an aluminum anode and a composite silver carbon cathode.

\* \* \* \* \*